(12) United States Patent
Mariani et al.

(10) Patent No.: US 11,241,850 B2
(45) Date of Patent: Feb. 8, 2022

(54) PROCESS AND PLANT FOR BUILDING TYRES FOR VEHICLE WHEELS

(71) Applicant: Pirelli Tyre S.p.A., Milan (IT)

(72) Inventors: Fiorenzo Mariani, Milan (IT); Pierangelo Misani, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 0 days.

(21) Appl. No.: 16/934,898

(22) Filed: Jul. 21, 2020

(65) Prior Publication Data

US 2020/0346422 A1 Nov. 5, 2020

Related U.S. Application Data

(62) Division of application No. 13/001,297, filed as application No. PCT/IT2008/000437 on Jun. 27, 2008, now Pat. No. 10,759,129.

(51) Int. Cl.
*B29D 30/10* (2006.01)
*B29D 30/00* (2006.01)
(Continued)

(52) U.S. Cl.
CPC .......... *B29D 30/005* (2013.01); *B29D 30/08* (2013.01); *B29D 30/2607* (2013.01);
(Continued)

(58) Field of Classification Search
CPC .......... B29D 30/005; B29D 2030/0022; B29D 2030/0055; B29D 2030/105; B29D 2030/202
See application file for complete search history.

(56) References Cited

U.S. PATENT DOCUMENTS 3,072,171 A 1/1963 Drakeford et al.
4,443,290 A 4/1984 Loeffler et al.
(Continued)

FOREIGN PATENT DOCUMENTS

DE 10 2005 055 609 A1 5/2007
EP 1 481 791 A2 12/2004
(Continued)

OTHER PUBLICATIONS

International Search Report from the European Patent Office for International Application No. PCT/IT2008/000437 dated Feb. 25, 2009.
(Continued)

*Primary Examiner* — Geoffrey L Knable
(74) *Attorney, Agent, or Firm* — Finnegan, Henderson, Farabow, Garrett & Dunner, L.L.P.

(57) ABSTRACT

A plant for building tyres of at least two different models for vehicle wheels, includes at least a tyre building line, which in turn, includes: a plurality of work stations arranged according to a sequential series, each work station being adapted for building at least one structural component of each tyre and assembling at least one elementary component; at least one handling device for the tyres being processed on the respective forming supports associated to each work station; and at least one transfer device adapted for transferring the tyre being processed on its forming support from any first work station of the sequential series to any other second work station not adjacent thereto of the sequential series, so that the tyre being processed on its forming support only passes in the first and second work stations.

12 Claims, 1 Drawing Sheet

(51) Int. Cl.
  *B29D 30/08* (2006.01)
  *B29D 30/26* (2006.01)
  *B29D 30/20* (2006.01)
(52) U.S. Cl.
  CPC ............... *B29D 2030/0022* (2013.01); *B29D 2030/105* (2013.01); *B29D 2030/202* (2013.01)

(56) References Cited

U.S. PATENT DOCUMENTS

| | | |
|---|---|---|
| 5,354,404 A | 10/1994 | Benjamin |
| 2003/0056881 A1 | 3/2003 | Lemaire et al. |
| 2003/0170336 A1 | 9/2003 | Caretta et al. |
| 2005/0126684 A1 | 6/2005 | Sieverding et al. |
| 2005/0145314 A1 | 7/2005 | Ikeda et al. |
| 2005/0194101 A1 | 9/2005 | Caretta et al. |
| 2006/0086451 A1 | 4/2006 | Nakata |
| 2006/0144500 A1 | 7/2006 | Lacagnina |
| 2008/0190562 A1 | 8/2008 | Winkler et al. |

FOREIGN PATENT DOCUMENTS

| | | |
|---|---|---|
| EP | 1 570 978 A1 | 9/2005 |
| JP | 08-011232 A | 1/1996 |
| JP | H09-174712 A | 7/1997 |
| JP | 2005-170044 A | 6/2005 |
| JP | 2006-001024 A | 1/2006 |
| RU | 2 258 608 C2 | 8/2005 |
| WO | WO 01/32409 A1 | 5/2001 |
| WO | WO 01/39963 A1 | 6/2001 |
| WO | WO 2007/060054 A1 | 5/2007 |
| WO | WO-2008/043382 A1 | 4/2008 |

OTHER PUBLICATIONS

A Decision on Grant Patent for Invention dated Mar. 2, 2012, from the Russian Patent Office in corresponding Russian Application No. 2011102961/05(0039920).

Translation of JP 08-011232 and JPO abstract for JP 08-011232, patent publication published Jan. 16, 1996.

Notice of Reasons for Rejection issued by the Japanese Patent Office, dated Aug. 28, 2012, 11 pages.

Office Action issued from the Japanese Patent Office in corresponding Application No. 2011-515740 dated Nov. 28, 2014, 11 pp.

Office Action cited in corresponding Japanese Appln. No. 2011-515740, issued from the Japanese Patent Office, dated Mar. 20, 2015, 8 pp. (including 4 pp. of English language translation).

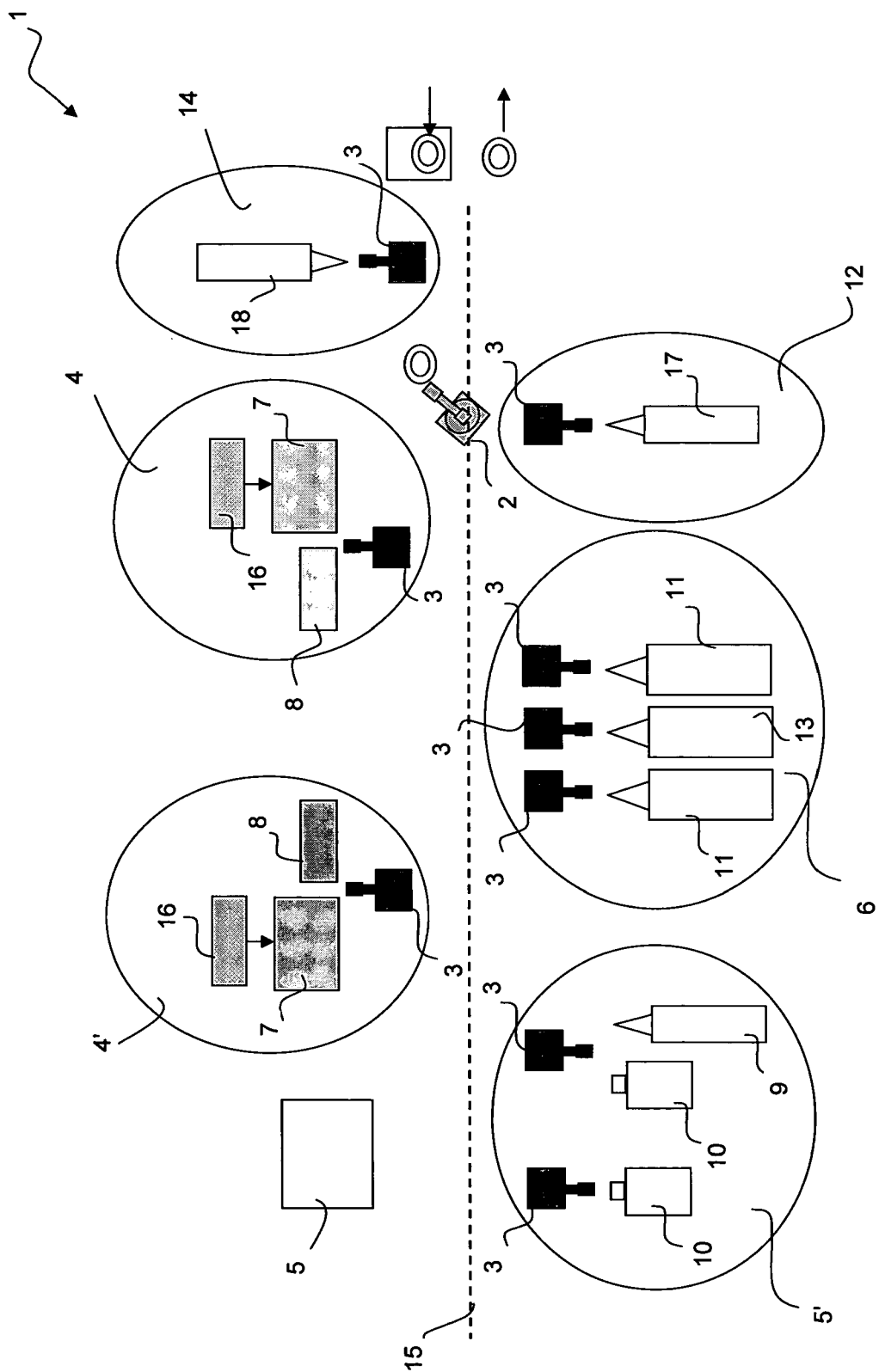

PROCESS AND PLANT FOR BUILDING TYRES FOR VEHICLE WHEELS

CROSS REFERENCE TO RELATED APPLICATIONS

This is a divisional application of U.S. application Ser. No. 13/001,297 filed Mar. 24, 2011, which is a U.S. National Phase application based on PCT/IT2008/000437 filed Jun. 27, 2008, all of which are incorporated herein by reference in their entireties.

The present invention relates to a process for building tyres for vehicle wheels.

The present invention also relates to a plant for building tyres for vehicle wheels, usable for carrying out the above mentioned building process.

Tyre production cycles comprise a building process, wherein the various components of the tyre itself are made and/or assembled in one or more building lines, and subsequently a moulding and vulcanization process is carried out in a suitable vulcanization line, adapted for defining the tyre structure according to a desired geometry and tread pattern.

A tyre generally comprises a toroidally ring-shaped carcass including one or more carcass plies, strengthened with reinforcing cords lying, in the so-called "radial" tyres, in substantially radial planes (a radial plane contains the rotation axis of the tyre). Each carcass ply has its ends integrally associated with at least one metal reinforcing annular structure, known as bead core, constituting the reinforcing at the beads, i.e. at the radially inner ends of the tyre, having the function of enabling the assembling of the tyre with a corresponding mounting rim. Placed crown wise to said carcass is a band of elastomeric material, called tread band, within which, at the end of the moulding and vulcanization steps, a raised pattern is formed for ground contact. A reinforcing structure, generally known as belt structure, is arranged between the carcass and the tread band. Such structure usually comprises, in the case of car tyres, at least two radially superposed layers of rubberised fabric provided with reinforcing cords, usually of metal material, arranged parallel to each other in each layer and in a crossed relationship with the cords of the adjacent layer, preferably symmetrically arranged with respect to the equatorial plane of the tyre. Preferably, the belt structure further comprises at a radially outer position thereof, at least on the ends of the underlying belt layers, also a third layer of textile or metallic cords, circumferentially disposed (at zero degrees).

The belt structure and the tread band together form the so-called "crown structure" of the tyre.

Finally, in tyres of the tubeless type, a radially inner layer, called liner, is present which has imperviousness features for ensuring the air-tightness of the tyre itself.

To the aims of the present invention and in the following claims, by the term "elastomeric material" it is intended a composition comprising at least one elastomeric polymer and at least one reinforcing filler. Preferably, such composition further comprises additives such as cross-linking and/or plasticizing agents. By virtue of the cross-linking agents, such material may be cross-linked by heating, so as to form the final manufactured article.

In the present context, by the term "green tyre" it is indicated a tyre obtained by the building process and not vulcanized and moulded yet.

As already illustrated, in the so-called "radial" tyres each of the cords arranged in the carcass ply or plies lies in a plane substantially radial to the axis of rotation of the tyre, that it, exhibits an orientation substantially orthogonal to the circumferential development direction. On the contrary, in the so-called "crossed ply" tyres, the carcass structure generally comprises at least one first carcass ply having cords slanting oriented relative to the circumferential development direction of the tyre, and a second carcass ply the cords whereof exhibit a slanting orientation and symmetrically crossed relative to the cords of the first ply.

Compared to the tyres for four wheel vehicles, the tyres for two wheel vehicles are required to have totally peculiar performance, which imply several structural differences. The most important differences result from the fact that when driving along a curve, a motorbike must tilt significantly relative to the position when driving on straight road, forming an angle with the perpendicular to the ground (called camber angle) which usually reaches 45° but which can reach 65° in extreme driving conditions. This, when the motorbike makes a curve, the tyre contact area progressively moves from the central zone of the tread band towards the axially outermost zone in the direction of the centre of the curve. For this reason, the tyres for two-wheel vehicles are characterised by a strong cross bending. Such cross bending is normally defined by the particular value of the bending ratio R between the distance between the radially external point of the tread band and the line passing by the laterally opposite ends of the tread band itself, measured on the equatorial plane of the tyre, and the distance measured along the tyre chord between said ends. In tyres for two-wheel vehicles, the value of the bending ratio R generally is not less than 0.15 and is normally in the order of about 0.3 in the case of rear tyres, and even higher, up to about 0.45, in the case of front tyres, compared to a value usually of the order of about 0.05 in tyres for motor vehicles.

Presently, tyres for two-wheel vehicles usually have a radial carcass structure associated to a belt structure that may comprise one or more belt layers shaped as a closed ring, essentially consisting of textile or metal cords suitably oriented relative to the cords belonging to the adjacent carcass structure.

In particular, the belt structure may be made by one or more continuous cords wound according to axially side by side coils and substantially parallel to the circumferential development direction of the tyre itself (the so-called "belt at zero degrees"). As an alternative, the belt structure may consist of two radially overlapped layers, each consisting of elastomeric material reinforced with cords arranged parallel to each other, said layers being arranged in such a way that the cords of the first belt layer are slanting oriented relative to the equatorial plane of the tyre, whereas the cords of the second layer also exhibit a slanting orientation but symmetrically crossed relative to the cords of the first layer (the so-called "crossed belt").

Thus the tyres for vehicles, and in particular those for two-wheel vehicles, may be of very different types from one another. This implies a considerable complication from the point of view of the tyre building plants and processes.

WO 01/32409, in the name of the same Applicant, describes a tyre building line provided with working stations, each arranged to make and assemble at least one structural component of the tyre being processed, wherein at least one series of tyres is treated at the same time, comprising at least one first and a second model of tyres differing from each other, and wherein the tyre transfer to the vulcanization line is carried out through robotized arms and according to a transferring rate equal to the transferring rate of the tyres to each of said working stations.

WO 01/39963, in the name of the same Applicant, illustrates a process for producing tyres that are different from each other, comprising a building unit having a plurality of working stations, each adapted for assembling at least one structural component on at least one type of tyre being processed, a vulcanization unit, and a device for transferring and moving the tyre being processed, operating between the working stations and the vulcanization unit.

EP 1 481 791 A2 describes a method of simultaneously producing tyres, the tyres being selected from a group of tyres with different build specifications in different sizes. The method comprises the steps of: selecting the tyre building equipment and materials required for constructing the respective type of tyre; calculating the corresponding number of cycles that each building equipment must perform to build a given lot; and automatically changing to a second building specification at a lot change, by switching to the second building specification after the last tyre of the first building specification passes; repeating the automatic changing to the next building specification at each station as each last tyre of each prior lot passes until a final lot is produced. The production system has at least four carcass building stations, each station being spaced at a predetermined distance, and preferably a crown structure building line, having working stations, separate from the carcass building line, wherein the carcass and the crown structures are joined in a segmented self-locking mould.

The processes of the type described in WO 01/32409 and in WO 01/39963 are aimed at increasing productivity in manufacturing processes of tyres built on a toroidal forming support and using elementary semi-finished products for building by automated, standardised steps, synchronised with each other. Such processes, however, do not allow obtaining a high technological flexibility, that is, the possibility of using for each tyre elementary semi-finished products differing by type of elastomeric material or by type of textile or metal reinforcing cord. In fact, such methods are suitable for producing tyres that differ in limited features, such as dimensions, optional presence of some structural components of the tyre—such as one or two carcass plies, reinforcing elements in bead zone—, arrangement of the coils of rubber metal wires forming the bead cores in the bead zone, more or less extended belt layer at zero degrees, presence of a layer and underlayer in the tread band.

This problem is even more felt in the case of building tyres for two-wheel vehicles. In this case, in fact, in most cases a same vehicle requires tyres of different models so the possibility of achieving a suitable technological flexibility becomes fundamental.

The method illustrated in EP 1 481 791 is technologically flexible as it allows obtaining tyres with semi-finished products having different features from one another, but it is limited in terms of productivity, for example as the model of tyre to be produced changes and require large sized plants for carrying out them.

Moreover, the Applicant has noted that in the production systems of this latter type, the management of a large number of materials and/or semi-finished products causes problems in synchronising the production steps of the various portions making up the tyre and thereby problems in the general management of the production system with negative consequences on productivity.

Finally, the Applicant has found that in all the plants illustrated in the aforementioned documents, in the event of failure of a single work station, the entire building plant must be blocked with the obvious drawbacks of the case.

In the present description and in the following claims, by "sequential series" of work stations it is means a set of at least three work stations arranged according to a predetermined installation sequence, wherein each work station between the first and the last is adjacent to two different work stations, a preceding and a subsequent one, the first work station of said set being adjacent and preceding the second work station of said set and the last work station of said set being adjacent and subsequent to the penultimate work station of said set.

Thus, subsequent and adjacent work stations and subsequent and not adjacent work stations are found in a sequential series.

Of course, if the work stations are three, the second and the penultimate work station coincide.

In the present description and in the following claims, by "elementary component" it is meant an elementary semi-finished product in the form of: a continuous elongated element of elastomeric material; a rubber metal or textile reinforcing cord, that is, coated with elastomeric material; a ribbon-like element of elastomeric material cut to size comprising at least two textile or metal cords, hereinafter called "strip-like element".

In the present description and in the following claims, by "structural component" of the tyre it is meant any part of the tyre suitable for carrying out a function or a portion thereof. Therefore, structural components are, for example, the liner, the under-liner, the abrasion-proof element, the bead core, the bead filler, the carcass ply, the belt strip, the belt underlayer, the tread band underlayer, the sidewall inserts, the sidewalls, the tread band, the reinforcing inserts.

In the present description and in the following claims, by "model" of tyre it is meant the set of geometrical features (such as for example tread band width, sidewall height, fitting diameter), structural (such as for example one- or two-ply structure, radial or with crossed carcass plies, with or without belt structure, type of belt structure—with crossed belts, zero degrees, crossed belts and zero degrees—, type of tread band with one or more layers etc.), and technological (such as for example mixture of the various structural components, material constituting the textile or metal reinforcing cords, type of formation of the reinforcing cords, etcetera).

The Applicant has therefore perceived that to build tyres with very different technological requirements, avoiding standstills of the entire plant, improving flexibility and even productivity of the processes of the type of those illustrated in WO 01/32409 and in WO 01/39963, and avoiding production plants of large overall dimensions and difficult to manage and synchronise like those illustrated in EP 1 481 791 A2, it is necessary to have a building plant provided with at least one device adapted for transferring the tyre being processed from any work station of the building line to any other work station of the same building line.

The Applicant has thus perceived that having at least one tyre building line for vehicle wheels on forming supports, comprising a plurality of work stations in a sequential series, each associated to at least one handling device of the tyres being processed, and at least one transfer device adapted for transferring the tyre being processed from any work station of said sequential series to any other work station not adjacent thereto of said sequential series, it is possible to produce at the same time batches of tyres with a high differentiation and technological complexity achieving high productivity and quality of the finished product.

Finally, the Applicant has found that in a process for building tyres of different models on respective forming supports building a plurality of structural components at a plurality of work stations arranged in a sequential series, wherein there is provided at least one step of transferring the tyre being processed from one work station to a work station not adjacent thereto, it is possible to obtain tyres with a high technological flexibility also increasing productivity.

In other words, the Applicant has found that avoiding the sequential passage of the tyres being processed in all the work stations of a building line, passing from one work station to the adjacent and subsequent one, and introducing a logic of selection and transfer of the tyres depending on the technological requirements of the tyre to be built and on the availability of the work stations, it is possible to improve both the flexibility and the productivity of known processes and plants for building different tyres, as well as avoiding the standstill of the entire plant in the case of failure of a single work station.

More precisely, according to a first aspect thereof, the invention relates to a method for selecting work stations in a line for building tyres for vehicle wheels, said tyres being at least of two different models, said building line comprising a plurality of work stations arranged according to a sequential series, each work station being adapted for building at least one structural component of each tyre, comprising the step of:

ii) selecting at least two work stations not adjacent to one another wherein a tyre being processed is transferred based on the tyre model, on the structural component to be built and on the availability of the work stations themselves, wherein the above transfer takes place in such a way that the tyre being processed only passes in said at least two work stations.

According to a second aspect thereof, the invention relates to a process for manufacturing tyres for vehicle wheels, said tyres being of at least two different models, comprising the steps of:

b) building at least a first and a second model of tyre on respective forming supports, by building each structural component at a plurality of work stations arranged according to a sequential series in a tyre building line, wherein the tyres being processed on the respective forming supports are transferred from one work station to the other by a transfer device;

wherein the step b) of building at least a first and a second tyre model comprises at least one step c) of transferring a tyre being processed on its own forming support from a first work station of the building line to a second work station not adjacent thereto in said sequential series;

wherein each step c) of transfer takes place in such a way that the tyre being processed on its forming support only passes in said first and second work station.

Since the process according to the invention is compatible with the use of elementary semi-finished products differing for each tyre produced, it allows obviating the aforementioned disadvantages of reduced technological flexibility and/or productivity, keeping high performance quality of the finished product.

The process according to the present invention therefore is technologically flexible and efficient. The Applicant in fact has verified that in a process of this type the productivity increases by a minimum of about 50% for each building line, if the flexibility required is maximum, to a maximum of about 80% for each building line, if the flexibility required is limited.

According to a third aspect thereof, the invention relates to a plant for building tyres for vehicle wheels, said tyres being of at least two different models, comprising at least a tyre building line which in turn comprises:

a plurality of work stations arranged according to a sequential series, each work station being adapted for building at least one structural component of each tyre;

at least one handling device for the tyres being processed on the respective forming supports associated to each work station; and at least one transfer device adapted for transferring the tyre being processed on its forming support from any first work station of said sequential series to any other second work station not adjacent thereto of said sequential series, so that the tyre being processed on its forming support only passes in said first and second work station.

Carrying out the above process, said plant achieves the same advantages mentioned above.

The Applicant has further verified that since the building plant is provided with a device for transferring the tyre being processed from any work station of said sequential series to any other work station not adjacent thereto of the same sequential series, it also allows overcoming the aforementioned disadvantages related to the need of interrupting the plant in the case of failure of a single work station.

Finally, the Applicant has verified that avoiding the use of the handling devices associated to the single work stations, also for transferring the tyres from one work station to the other, and assigning a special transfer device of such operation, it is also possible to optimise the cycle times of the different work stations and increase the building plant productivity.

The present invention, in at least one of the above aspects thereof, can exhibit at least one of the following preferred features.

Said step of selecting at least two work stations is preferably preceded by the step of receiving information on the tyre model to be built and on the availability of the work stations. In this way it is possible to process such information and select the most appropriate work stations in order to optimise production costs and times.

Preferably, the building step b) is preceded by a step of:

a) arranging a plurality of elementary components of the tyres to be built at said plurality of work stations.

Advantageously, the building step b) comprises, upstream of the transfer step c), a step of:

d) selecting the work station whereto a tyre being processed is transferred based on the tyre model, on the structural component to be built and on the availability of the work stations themselves.

This allows a complete assessment of the situation at the time of building a tyre and thus the selection of the most suitable work stations.

Preferably, the building step b) is carried out by transferring the tyre being processed on its forming support from a work station to a subsequent work station of said sequential series. In other words, the process for building tyres provides for the transfer of the tyre being processed along a single travelling direction of the sequential series. In this way, it is prevented that the tyre is moved forward and backward in said sequential series with advantages from the point of view of the process times and management.

According to a preferred embodiment, said building step b) comprises the steps of:

i) building a carcass structure, said carcass structure comprising at least one carcass ply and a pair of annular anchoring structures;

ii) building a belt structure, said belt structure comprising at least one belt layer; and iii) building a tread band.

Preferably, in at least one model of tyre to be built the bending ratio R between the distance between the radially outer distance of the tread band and the line passing by the laterally opposite ends of the tread band itself, measured on the equatorial plane of the tyre, and the distance measured along the tyre chord between said ends is more than or equal to, about 0.15. In this way it is possible to obtain tyres for two-wheel vehicles.

According to preferred embodiments, said bending ratio R is less than or equal to, about 0.3. In this way it is possible to obtain rear tyres of two-wheel vehicles.

According to other preferred embodiments, said bending ratio R is less than or equal to, about 0.45. In this way it is possible to obtain front tyres of two-wheel vehicles.

Advantageously, in the above step ii), said at least one belt layer comprises a layer of textile or metal cords, oriented circumferentially at 0°.

Preferably, the step iii) of building the tread band comprises a step iii') of applying a tread band in a position radially external to said belt structure.

Advantageously, there is provided a step iv) of applying at least a portion of sides of the tyre being processed in a position axially external to the tyre being processed.

The step iii) of building the tread band may comprise, prior to the step iii') of applying the tread band, the step iii") of applying at least one tread band underlayer in a position radially external to said belt structure.

Preferably, at least one between the above steps iii'), iii") or iv) is carried out by applying at least one continuous elongated element of elastomeric material according to side by side or at least partially overlapped coils.

Preferably, at least one structural component is built by assembling at least one elementary component.

The process for manufacturing tyres may further comprise a pre-step of feeding elementary components to at least one work station.

Advantageously, the forming support is a toroidal support.

Preferably, said toroidal support has a radially external surface corresponding to a radially internal surface of the tyre being processed.

According to preferred embodiments, said first and second tyre models differ by size.

According to other preferred embodiments, said first and second tyre models differ by structural components.

According to different preferred embodiments, said first and second tyre models differ by elementary components used.

Preferably, said plurality of work stations comprises:

at least one carcass structure building work station, said carcass structure comprising at least one carcass ply and a pair of annular anchoring structures;

at least one belt structure building work station, said belt structure comprising at least one belt layer; and at least one tread band building work station.

Advantageously, the carcass structure building work stations of the tyre building plant are two.

Preferably, a first carcass structure building work station is adapted for building a carcass structure differing from the carcass structure built by a second carcass structure building work station.

According to a preferred embodiment of the building plant, each carcass structure building work station comprises at least:

a ply application unit; and a bead core application unit.

Preferably, at least one work station is adapted for building at least one structural component of each tyre assembling at least one elementary component.

Preferably, the bead core application unit comprises at least one device having a dispenser of a continuous elongated element shaped as a rubber metal reinforcing cord.

Even more preferably, at least one actuator is connected to the handling device associated to said carcass structure building work station, for moving the forming support so as to apply said continuous elongated element according to radially overlapped coils.

Preferably, the belt structure building work station comprises:

an under-belt layer application unit provided with devices for applying an under-belt layer in a position radially external to said carcass structure.

Advantageously, said belt structure building work station comprises at least one belt layer application unit provided with devices for applying at least a first belt layer to a position radially external to said carcass structure.

Preferably, such belt layer application units are two.

Preferably, the belt structure building work stations are at least two.

Advantageously, a first belt structure building work station is adapted for applying at least two radially overlapped belt layers, said layers being arranged in such a way that the cords of the first belt layer are slanting oriented relative to the equatorial plane of the tyre being processed, whereas the cords of the second layer also exhibit a slanting orientation but symmetrically crossed relative to the cords of the first layer.

Preferably, a second belt structure building work station is adapted for applying at least one belt layer comprising a layer of textile or metal cords, oriented circumferentially at V.

According to an embodiment of the building plant, the tread band building work station comprises at least one tread band application unit.

Preferably, the tread band application units are two.

Advantageously, the plant further comprises at least one sidewall building work station provided with a sidewall application unit for building at least a sidewall portion in a position axially external to the tyre being processed.

Preferably, the building plant further comprises at least one tread band underlayer application unit provided with devices for applying at least one tread band underlayer.

Such unit is preferably arranged into the tread band building work station.

The tyre building plant may further comprise a liner application work station provided with a liner application unit.

The tyre building plant may further comprise at least one elementary component feeding unit.

According to preferred embodiments, at least one of the said work stations comprises at least one device exhibiting a dispenser of a continuous elongated element of elastomeric material.

Even more preferably, at least one actuator is connected to the handling device associated to said work station for moving the forming support so as to apply said continuous elongated element according to side by side or at least partially overlapped coils.

Optionally, the building plant may comprise a step of preparing elementary components adapted for being fed to at least one work station.

Preferably, the transfer device adapted for transferring the tyre being processed on its forming support from a work station to another work station of said sequential series comprises at least one robotized arm.

Moreover, said transfer device is preferably adapted for moving on a guiding track.

Advantageously, the handling device for the tyres being processed on the respective forming supports comprises at least one robotized arm.

BRIEF DESCRIPTION OF THE DRAWING

Further features and advantages of invention will appear more clearly from the following description of some preferred examples of methods for selecting work stations, processes for manufacturing tyres and tyre building plants according to the invention, made by way of an indicative non-limiting example with reference to the annexed drawings, wherein:

FIG. 1 shows a schematic layout of a plant for building tyres for vehicle wheels wherein the method for selecting work stations and the process for manufacturing tyres according to an embodiment of the present invention are carried out.

With reference to such FIGURE, reference numeral 1 globally indicates a building line of a plant for building tyres for vehicle wheels according to the present invention. The tyres to be built are at least of two different models. Such models may differ in terms of size, structural components and/or elementary components.

The building line 1 of the plant comprises a plurality of work stations 4, 4', 5, 5', 6, 12, 14, each of which is adapted for building at least one structural component of each tyre, by assembling at least one elementary component. The work stations 4, 4', 5, 5', 6, 12, 14 are arranged according to a sequential series, according to the definition given above.

The building line 1 of the system further comprises at least one handling device 3 for the tyres being processed on the respective forming supports associated to each work station 4, 4', 5, 5', 6, 12, 14. Each handling device 3 is adapted for cooperating with the respective work station 4, 4', 5, 5', 6, 12, 14 for assembling said elementary components.

The building line 1 also comprises at least one transfer device 2, which is adapted for transferring the tyre being processed on its forming support from any first work station of the sequential series to any other second work station even not adjacent to the first one, so that the tyre being processed on its forming support only passes in said first and second work station along a transfer path.

Said transfer path is the path followed by the forming support 2 and may be of any type (rectilinear, zigzag, etc.). If the transfer takes place from one work station 4, 4', 5, 5', 6, 12, 14 to a subsequent one and not adjacent thereto, said transfer path is generally different from the path that would be followed by the transfer support 2 for moving from one work station 4, 4', 5, 5', 6, 12, 14 to the work station 4, 4', 5, 5', 6, 12, 14 adjacent and subsequent thereto in said sequential series.

In particular, the plurality of work stations 4, 4', 5, 5', 6, 12, 14 comprises:
at least one carcass structure building work station 4, 4';
at least one belt structure building work station 5, 5'; and
at least one tread band building work station 6;
wherein the carcass structure comprises at least one carcass ply and a pair of annular anchoring structures and the belt structure comprises at least one belt layer.

As shown in the FIGURE, the first carcass structure building work stations 4, 4' are two, a first carcass structure building work station 4 adapted for building a carcass structure which may be different from the carcass structure built by a second carcass structure building work station 4'. As an alternative, the first carcass structure building work station 4 and the second carcass structure building work station 4' may carry out the building of the same carcass structure on a respective forming drum, for example in the case of two-ply tyres.

Each carcass structure building work station 4, 4' comprises a ply application unit 7 and a bead core application unit 8.

The bead core application unit 8 is preferably provided with a device exhibiting a dispenser of a continuous elongated element shaped as a rubber metal reinforcing cord, whereas actuators preferably connected to each handling device 3 associated to the carcass structure building work stations 4, 4', move the forming support so as to wind said continuous elongated element according to preferably radially overlapped coils for manufacturing annular anchoring structures.

In the embodiment shown in the FIGURE, said belt structure building work stations 5, 5' are two (whereof only one is detailed in FIG. 1). Each of them comprises an under-belt layer application unit 9 provided with devices for applying an under-belt layer in a position radially external to said carcass structure.

Each belt structure building work station 5, 5' further comprises at least one belt layer application unit 10 provided with devices for applying at least a first belt layer in a position radially external to said carcass structure.

A first belt structure building work station 5 is preferably adapted for applying at least two radially overlapped belt layers, said layers being arranged in such a way that the cords of the first belt layer are oriented sideways relative to the equatorial plane of the tyre being processed, whereas the cords of the second layer also exhibit a slanting orientation but symmetrically crossed relative to the cords of the first layer.

A second belt structure building work station 5' of the tyre building plant shown in the FIGURE comprises two belt layer application units 10.

Preferably, said second belt structure building work station 5' is adapted for applying at least one belt layer comprising a layer of textile or metal cords, oriented circumferentially at 0°.

The tread band building work station 6 of the building line 1 comprises at least one tread band application unit 11.

In the embodiment shown in the FIGURE, the tread band building work station 6 comprises two tread band application units 11 and one tread band underlayer application unit 13. The latter is provided with devices for applying at least one tread band underlayer.

However, such tread band underlayer application unit 13 may be arranged outside the tread band building work station 6 in a dedicated building work station.

The building plant 1 further comprises at least one sidewall building work station 12 provided with a sidewall application unit 17 for building at least a sidewall portion in a position axially external to the tyre being processed.

The building plant 1 shown in FIG. 1 further comprises work station for applying a liner 14 provided with a liner application unit 18.

The building line 1 is provided with a strip-like element feeding unit 16 for each carcass structure building work station 4, 4'. Similar strip-like element feeding units may be provided for each belt structure building work station 5, 5'.

Preferably, at least one of the above work stations 4, 4', 5, 5', 6, 12, 14 in sequential series comprises a device that exhibits a dispenser of a continuous elongated element of elastomeric material. In this case, each work station provided with such device also comprises one or more actuators for moving the forming support so as to wind the continuous elongated element according to side by side and/or at least partially overlapped coils. Even more preferably, at least the under-belt layer application unit 9, the tread band underlayer application unit 13, the tread band application units 11, the sidewall application unit 17, the liner application unit 18, comprise each the above device.

The tyre building plant according to an embodiment of the invention may comprise a preparation line for some elementary components (generally strip-like elements and/or rubber cords) adapted for being fed to the work stations 4, 4', 5, 5'. Such line is not shown in the FIGURE.

The transfer device 2 adapted for transferring the tyre being processed on its forming support from a work station to another work station of the sequential series comprises a robotized arm. Preferably, the transfer device 2 is associated to a guiding track 15 whereon such robotized arm moves.

Preferably, each handling device 3 for the tyres being processed on the respective forming supports comprises at least one robotized arm.

According to preferred embodiments of the present invention, at least one model of tyre to be built is for two-wheel vehicles, wherein the bending ratio R between the distance between the radially outer distance of the tread band and the line passing by the laterally opposite ends of the tread band itself, measured on the equatorial plane of the tyre, and the distance measured along the tyre chord between said ends is more than or equal to, about 0.15.

In particular, said bending ratio R is less than or equal to, about 0.3 or less than or equal to, about 0.45, based on the fact that the tyre to be built is of the rear or front type.

Preferably, the forming support is a toroidal support. Even more preferably, the toroidal support has a radially external surface corresponding to a radially internal surface of the tyre being processed (and built).

The method for selecting work stations 4, 4', 5, 5', 6, 12, 14 in a building line 1 of tyres in at least two different models, wherein said building line 1 comprises a plurality of work stations 4, 4', 5, 5', 6, 12, 14 arranged according to a sequential series, wherein each work station 4, 4', 5, 5', 6, 12, 14 is adapted for building at least one structural component of each tyre, preferably by assembling at least one elementary component, according to the present invention, comprises the step of:

selecting at least two work stations 4, 4', 5, 5', 6, 12, 14 not adjacent to each other whereto a tyre being processed is transferred based on the tyre model, on the structural component to be built and on the availability of the work stations themselves.

The transfer is carried out so that the tyre being processed only passes in said at least two work stations 4, 4', 5, 5', 6, 12, 14 along a transfer path.

The method for selecting work stations 4, 4', 5, 5', 6, 12, 14 comprises, prior to the selection step, the step of receiving information on the model of tyre to be built and on the availability of the work stations 4, 4', 5, 5', 6, 12, 14.

In other words, the selection method according to the invention provides for the reception of the above information and the processing thereof so as to select the most suitable work stations 4, 4', 5, 5', 6, 12, 14 to transfer the tyres being processed.

Preferably, according to a step a), the tyre building process provides for arranging a plurality of elementary components of the tyres to be built at a plurality of work stations 4, 4', 5, 5', 6, 12, 14.

Afterwards, the process provides for a step b) of building at least a first and a second model of tyre on respective forming supports, building each structural component, preferably by assembling at least one of said elementary components, at the work stations 4, 4', 5, 5', 6, 12, 14. The latter are arranged according to a sequential series in a tyre building line 1, wherein the tyres being processed on the respective forming supports are transferred from one work station 4, 4', 5, 5', 6, 12, 14 to the other by a transfer device 2.

According to the invention, the step b) of building at least a first and a second tyre model comprises at least one step c) of transferring a tyre being processed on its own forming support from a first work station 4, 4', 5, 5', 6, 12, 14 of the building line 1 to a second work station 4, 4', 5, 5', 6, 12, 14 not adjacent thereto in said sequential series.

Moreover, according to the process of the invention, each transfer step c) is carried out so that the tyre being processed on its forming support only passes in said first and second work station 4, 4', 5, 5', 6, 12, 14 along a transfer path.

According to a preferred embodiment, the building step b) comprises, upstream of the transfer step c), a step of:

d) selecting the work station 4, 4', 5, 5', 6, 12, 14 whereto a tyre being processed is transferred based on the tyre model, on the structural component to be built and on the availability of the work stations 4, 4', 5, 5', 6, 12, 14 themselves.

The building step b) is preferably carried out by transferring the tyre being processed from a work station 4, 4', 5, 5', 6, 12, 14 to a subsequent work station 4, 4', 5, 5', 6, 12, 14 of said sequential series. That is, the transfer takes place according to a travelling direction of the building line 1.

In particular, the building step c) comprises the steps of:

i) building a carcass structure, which comprises at least one carcass ply and a pair of annular anchoring structures;

ii) building a belt structure, which comprises at least one belt layer; and iii) building a tread band.

According to a preferred embodiment, the above step ii) comprises building a belt structure provided with a layer of textile or metal cords, oriented circumferentially at 0°.

The process for manufacturing tyres further comprises a pre-step of feeding elementary components into the corresponding work station.

With reference to the tyre building line 1, an operating example of the plant illustrated in FIG. 1 shall now be described, for example in the case of two models of tyres A and B, where A is a one-ply tyre and B is a two-ply tyre, A and B having both a layer of metal cords at 0° as belt structure.

A forming support for tyre A being processed is transferred to the liner application work station 14 wherein the liner application unit 18 applies a liner layer thereon, preferably by the application of at least one continuous elongated element of elastomeric material according to side by side and/or overlapped coils. Such liner application step may be preceded by an application step of at least one bead reinforcing fabric and/or by an application step of an abrasion-proof element on the forming support of tyre A.

Afterwards it is also possible to apply a under-liner layer in a position radially external to the liner layer.

Tyre A being processed is transferred to a carcass structure building work station 4 or 4'—according to the type of ply required by tyre A or to the availability of said work stations 4, 4'—where, according to step i), the building of the carcass structure is carried out. In this example, the one-ply tyre A is carried by the transfer device 2 from the liner application work station 14 directly to the second carcass structure building work station 4' as the latter is free, without passing by the first carcass structure building work station 4, according to what provided in the selection step of said method and with step c) of the process according to the invention.

In said second carcass structure building work station 4', a carcass ply is applied in a position radially external to the liner layer or to the under-liner layer (if provided), by the ply application unit 7, preferably by laying a plurality of strip-like elements side by side to each other. According to different project specifications, further elementary components may be applied to manufacture further structural components of the carcass structure.

Afterwards, step i) provides for applying at least a pair of annular anchoring structures at the axially opposite ends of the carcass ply. Such step is carried out by the bead core application unit 8, the operation whereof has been illustrated hereinbefore.

Afterwards it is possible to apply, at the carcass ply of tyre A being processed, a plurality of inside and/or outside reinforcing elements and/or an abrasion-proof element.

At the same time as the building of tyre A, also tyre B is built according to step b) of the process illustrated above.

More precisely, the forming support of tyre B being processed is transferred to the liner application work station 14 as soon as this is left free by tyre A being processed. The same process described above for tyre A is carried out in the above liner application work station 14.

According to step i) of the present invention, the carcass structure building is then carried out: Tyre B being processed is transferred by the transfer device 2 into the first carcass structure building work station 4 for applying the first carcass ply, such work station is free since tyre A has been transferred to the second carcass structure building station 4'. After that, the transfer device 2 transfers tyre B into the second carcass structure building work station 4' for applying the second carcass ply once that tyre A, completed its carcass structure building step, has been transferred from the above work station.

In particular, in the second carcass structure building work station 4' a second carcass ply is applied in a position radially external to the first carcass ply of tyre B with methods similar to those of application of the first carcass ply. Such step is followed by the application of at least a further pair of annular anchoring structures at the axially opposite ends of the second carcass ply.

According to step c), tyre A being processed is then transferred by the transfer device 2 into the second belt structure building work station 5'.

In other words, in the example illustrated herein, tyre A being processed is transferred from the second carcass structure building work station 4' to the second belt structure building work station 5' without passing through the first belt structure building work station 5.

In such second belt structure building work station 5' there is carried out the step ii) of building the belt structure which, in this specific example, provides first for the application of an under-belt layer in a position radially external to tyre A being processed by the under-belt layer application unit 9, preferably by the application of at least one continuous elongated element of elastomeric material according to side by side and/or partially overlapped coils, then the application of a belt layer obtained by the application of a rubber metal cord layer oriented circumferentially at 0°, in a special belt layer application unit 10.

According to the above step c), tyre B being processed is transferred by the transfer device 2 into the second belt structure building work station 5'.

In other words, tyre B being processed is transferred from the first carcass structure building work station 4 to the second belt structure building work station 5' without passing through the work station 5.

Moreover, it should be noted that thanks to the preferred configuration of the second belt structure building work station 5' (two belt layer application units 10), the transfer of tyre B in the above work station can advantageously take place even if in said work station there is still tyre A.

The step ii) of building the belt structure of tyre B is carried out in such work station 5' similarly to what described above for building tyre A.

Tyre A being processed is then transferred by the transfer device 2 into the tread band building work station 6 wherein the tread band building step iii) is carried out. Such step iii) may comprise the sub-step iii") of applying at least one tread band underlayer in a position radially external to the belt structure, in the tread band underlayer application unit 13. The step iii) finally comprises the sub-step iii") of applying at least one tread band layer in a position radially external to said tread band underlayer, if provided, or to said belt structure, in a tread band application unit 11. If the tread band layers are two, these are preferably applied in a sequence in the two respective tread band application units 11. Preferably, at least one between the above steps iii') and iii") are carried out by applying at least one continuous elongated element of elastomeric material according to side by side and/or at least partially overlapped coils.

At the end of the building of the belt structure, also tyre B being processed is transferred by the transfer device 2 into the tread band building work station 6 wherein the tread band building step iii) is carried out with methods similar to those described for building the tread band of tyre A.

Also in this case, thanks to the preferred configuration of the tread band building work station 6 (two tread band application units 11), tyre B can be transferred to the above tread band building work station 6 while tyre A is still present, further improving productivity.

Afterwards, tyre A being processed is transferred by the transfer device 2 into the sidewall building work station 12. In such work station 12 the sidewall application unit 17 provides to applying at least one portion of sidewalls of tyre A in a position axially external to said tread band, carrying out step iv), by the application of at least one continuous elongated element of elastomeric material according to side by side and/or partially overlapped coils.

After that, also tyre B being processed is transferred by the transfer device 2 into the sidewall building work station 12 wherein the sidewall application unit 17 provides to applying at least one portion of sidewalls of tyre B with methods similar to those described for tyre A.

Tyres A and B thus built are transferred to optional further work stations for the application of optional elements such as barcodes, labels, etc. or in output from the building line 1 to proceed towards a moulding and vulcanisation unit, not shown herein.

Within the scope of the above present description and in the following claims, all numerical values indicating amounts, parameters, percentages and so on are always to be deemed as preceded by the term "about", if not otherwise stated. Moreover, all numerical value ranges include all possible combinations of the maximum and minimum numerical values and all possible intermediate ranges, besides those specifically indicated in the text.

The invention claimed is:

1. A method for selecting work stations in a tyre building line for different models of tyres, wherein the building line comprises carcass structure building work stations and belt building work stations, and each work station is adapted for building at least one structural component of the different models of tyres, the method comprising:
   selecting a first belt building work station of the belt building work stations based on a first model of tyre;
   selecting a second belt building work station of the belt building work stations based on a second model of tyre different from the first model of tyre;
   transferring and releasing, by a robotized arm, a first forming support holding the first model of tyre from a first carcass structure building work station to the first belt building work station, wherein the transfer and release of the first forming support occurs at the same time as the building of a second carcass structure of the second model of tyre held by a second forming support in a second carcass structure building work station;
   transferring and releasing, by the robotized arm, the second forming support holding the second model of tyre from the second carcass structure building work station to the second belt building work station, wherein the transfer and release of the second forming support occurs at the same time as the building of a first belt structure on the first forming support in the first belt building work station;
   wherein during the transfer of the first and second forming supports, the first and second forming supports follow different first and second paths, respectively.

2. The method for selecting work stations according to claim 1, wherein the first carcass structure building work station comprises a strip-like element feeding unit, a ply application unit, and a bead core application unit and builds a first carcass structure with at least a ply and a bead core.

3. The method for selecting work stations according to claim 1, wherein the second carcass structure building work station comprises a strip-like element feeding unit, a ply application unit, and a bead core application unit and builds the second carcass structure with at least a ply and a bead core.

4. The method for selecting work stations according to claim 1, wherein the first belt building work station comprises a plurality of belt layer application units and builds the first belt structure of the first model of tyre with two belt layers.

5. The method for selecting work stations according to claim 1, wherein the second belt building work station comprising a plurality of belt layer application units and builds a second belt structure for another of the second model of tyre with a single belt layer.

6. The method for selecting work stations according to claim 1, wherein a first belt structure handling device is associated with the first belt building work station to receive the first forming support, and a second belt structure handling device is associated with the second belt building work station to receive the second forming support.

7. The method for selecting work stations according to claim 1, wherein following the different first and second paths includes following the different first and second paths from start to finish in the tyre building line based on the model of tyre on the forming support and on the availability of the plurality of work stations.

8. The method for selecting work stations according to claim 1, wherein selecting the first belt building work station is chosen from one or more of an availability of the first belt building work station, a structural component to be built, and a technological requirement of the first model of tyre.

9. The method for selecting work stations according to claim 1, wherein selecting the second belt building work station is chosen from one or more of an availability of the second belt building work station, a structural component to be built, and a technological requirement of the second model of tyre.

10. The method for selecting work stations according to claim 1, further comprising:
    receiving information related to the first model of tyre and the availability of the any one of the belt building workstations, and
    wherein selecting the first belt building work station is based on the received information.

11. The method for selecting work stations according to claim 1, further comprising:
    receiving information related to the second model of tyre and the availability of the belt building workstations, and
    wherein selecting the second belt building work station is based on the received information.

12. The method for selecting work stations according to claim 1, wherein selecting the first belt building work station is based on at least one of a production cost or a production time.

* * * * *